Figure 1:
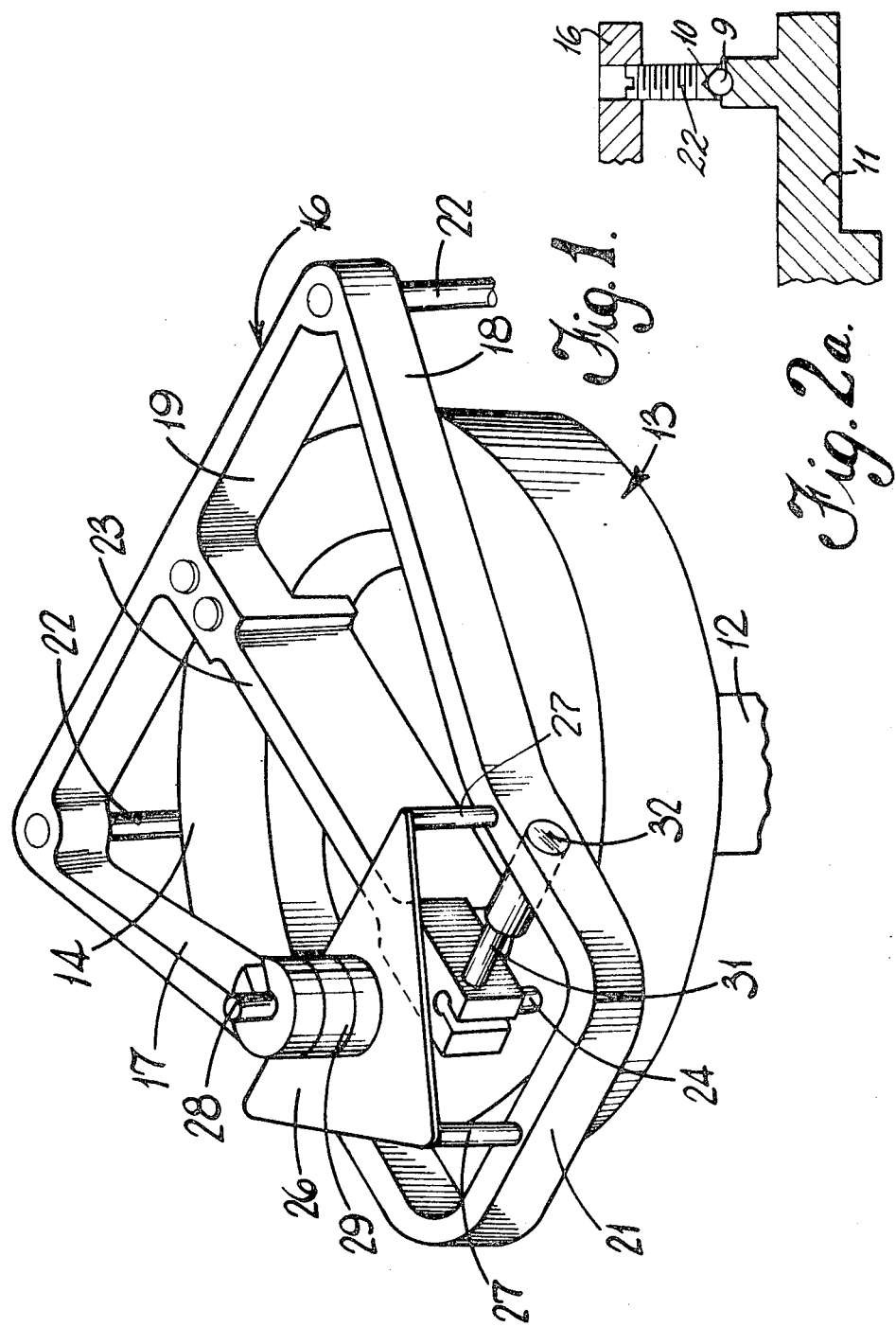

United States Patent
Blakeley et al.

[11] 3,724,259
[45] Apr. 3, 1973

[54] METHOD OF TESTING THE LUBRICATION PROPERTIES OF A LIQUID

[75] Inventors: Ronald Edward Blakeley, Solihull; Robert Turner, Hampton Magna, both of England

[73] Assignee: Joseph Lucas (Industries) Limited, Birmingham, England

[22] Filed: July 10, 1970

[21] Appl. No.: 53,914

[30] Foreign Application Priority Data

July 15, 1969    Great Britain.....................35,485/69

[52] U.S. Cl..........................................73/10, 356/70
[51] Int. Cl............................G01n 3/56, G01n 33/30
[58] Field of Search...........73/10, 64 R; 356/108, 70

[56] References Cited

UNITED STATES PATENTS

| | | | |
|---|---|---|---|
| 1,810,405 | 6/1931 | Schaeffer | 73/10 |
| 2,518,647 | 8/1950 | Teeple et al. | 356/108 |
| 2,037,365 | 4/1936 | Cammen | 73/64 |
| 3,178,928 | 4/1965 | Howe | 73/10 UX |
| 1,991,713 | 2/1935 | Walker | 73/10 |

FOREIGN PATENTS OR APPLICATIONS 1,150,228    6/1963    Germany...............................73/10

OTHER PUBLICATIONS

Publication: "Control of Thickness of Evaporated Layers During Evaporation." by G. Papp; Oct. 1959. pp. 911–912. Q184R5.
Timken Engr. Journal, "The Timken Wear & Lubricant Tester." Copyright 1933. Pp. 257–258.

Primary Examiner—Louis R. Prince
Assistant Examiner—Daniel M. Yasich
Attorney—Holman and Stern

[57]    ABSTRACT

In a method of testing the lubrication properties of a liquid the liquid is poured onto a plate and the plate is rotated so that the thickness of the film of liquid decreases until eventually a point is reached at which interference fringes are seen. When the last interference fringe is seen passing a predetermined point a probe is placed in contact with the plate and the length of time taken for the frictional heat developed between the probe and the plate to destroy the film is measured.

7 Claims, 4 Drawing Figures

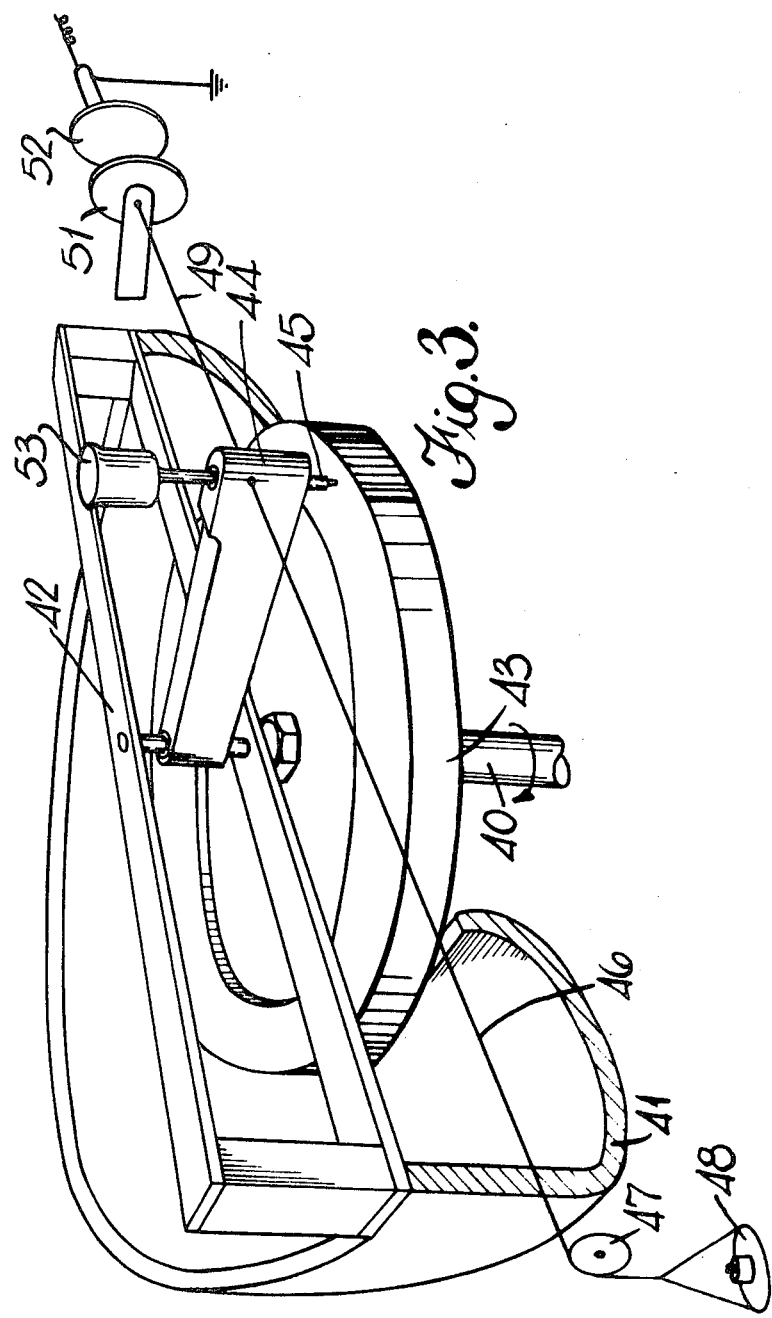

METHOD OF TESTING THE LUBRICATION PROPERTIES OF A LIQUID

This invention relates to a method and apparatus for testing the lubrication properties of a liquid, particularly a fuel to be used in an aircraft.

In one aspect the invention resides in a method of testing the lubrication properties of a liquid comprising pouring the liquid onto a plate which is rotated so that the thickness of the film of liquid decreases and eventually a point is reached at which interference fringes are observed, and then when the last interference fringe is seen passing a predetermined point, placing a probe in contact with the plate and measuring the length of time taken for the frictional heat developed between the probe and plate to destroy the film.

It will be appreciated that in comparing different liquids it is necessary to ensure that the thickness of the film tested is always the same. The observance of the final interference fringe passing a given point provides a convenient and accurate measure of the thickness of the film.

In a further aspect, the invention resides in apparatus for testing the lubrication properties of a liquid comprising a casing, a supporting framework including first and second frame members, said framework being pivotally mounted on the casing adjacent one end of the framework and being positioned above said plate, a resilient member secured at one end thereof to said framework intermediate said first and second frame members and carrying at its free end said probe, the resilience of said resilient member permitting said probe to move angularly relative to said first and second frame members in the plane of the framework but resisting angular movement of the probe relative to said first and second frame at right angles to the plane of the framework, means acting on said framework at its end adjacent said probe to pivot the framework and urge said probe into contact with the plate, and sensing means operable, in use to detect angular movement of the probe relative to said first and second frame members in the plane of the framework when the frictional heat developed between the probe and the plate destroys a film of said liquid of predetermined thickness on the plate.

Figure 2:
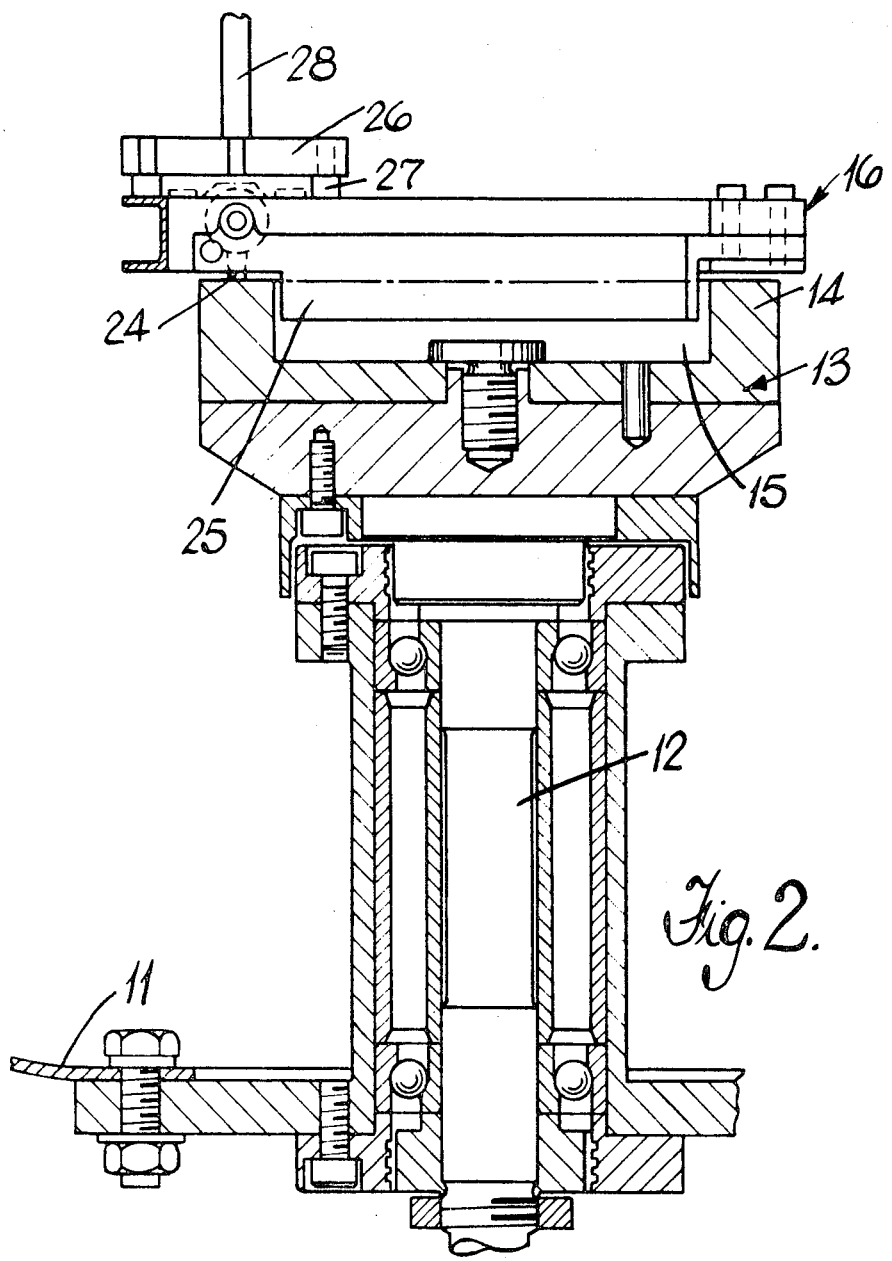

In the accompanying drawings,

FIG. 1 is a perspective view of apparatus according to one example of the invention, and FIGS. 2 and 2a are sectional views respectively of FIG. 1, and FIG. 3 is a perspective view, partly in section, of apparatus according to a second example of the invention.

Referring to FIGS. 1 and 2, the apparatus comprises a casing 11 (see FIG. 2) in which is journalled a spindle 12 mounting a circular plate 13 for rotation relative to the casing. The plate 13 is formed integrally on its upper surface with an upwardly extending, circumferential rim 14, the rim defining with the upper surface of the plate 13 a circular recess 15.

An open framework 16 comprises first and second frame members 17,18 interconnected at each end by further frame members 19,21 respectively, the framework 16 being supported above the plate 13 on a pair of legs 22 which extend downwardly from opposite ends respectively of the frame member 19. The legs 22 at their ends remote from the framework are formed with conical indentations 10 each resting on a ball 9 carried in a respective recess in the casing 11 so that the framework 16 is capable of pivotal movement about the balls 9 and also the framework can be removed from the casing 11. Secured to the frame member 19 intermediate its ends is a resilient arm 23, the arm 23 extending inwardly from the frame member 19 between the frame members 17,18 and terminating short of the frame member 21. The arm 23 is formed at its free end adjacent the frame member 21 with a downwardly extending probe 24 which projects below the lower surface of the arm 23, and into contact with the rim 14 when the framework is in position above plate 13. The arm 23 is further formed intermediate its ends with an integral extension piece 25 projecting from the lower surface of the arm and extending into the circular recess 15. The arrangement of the extension piece 25 is such that shear center of the resilient arm 23 lies in the same plane as the free end of the probe and hence in the same plane as the uppermost surface of the rim 14 when the framework is in position above the plate 13. Thus if a frictional force is exerted between the probe 24 and the rim 14 there will be no tendency for the arm 23 to twist, and the probe will only move angularly in plane of the framework. Also the resilience of the arm 23 is such that angular movement of the probe 24 relative to the members 17,18, in the plane of the framework is permitted, but angular movement of the probe 24 relative to the members 17, 18 at right angles to the plane of the framework is resisted.

A triangular plate 26 is mounted on the framework 16 remote from the member 19 on three legs 27 which extend downwardly towards the framework from the apices respectively of the triangular plate 26 and which are secured to the frame members 17, 18, 21 respectively. An upwardly extending spigot 28 projects from the upper surface of the plate 26 so that weights 29 adapted to be engaged with the spigot 28 can be placed on the plate 26. The arrangement is such that when the weights 29 are engaged with the spigot 28, the center of gravity of the plate 26 is coincident with the vertical axis of the probe 24 so that when the framework is in position above the plate 13, the framework is pivoted about the balls 9 and the probe 24 is urged into contact with the upper surface of the rim 14. The arm 23 is also formed adjacent its free end with a pin 31 which extends laterally from one side of the arm towards the frame member 18, the frame member 18 carrying a sensing coil 32 positioned adjacent the pin 31.

In order to test the lubrication properties of a liquid, the liquid is poured onto the rim 14 of the plate 13 which is then rotated so that the thickness of the film of the rim gradually decreases, and a point is reached at which interference fringes are observed. Rotation is continued until the thickness of the film is reduced to a value such that the last interference fringe is seen, and when this last fringe passes the edge of the rim 14, or some other conveniently marked position on the rim the speed is reduced and the frame 16 containing weights on the plate 26 is placed in position with the legs 22 on the balls 9 so that the framework is pivoted about the balls 9 until the probe 24 engages the upper surface of the rim 14. The friction between the probe 24 and rim 14 breaks down the liquid film after a period of time which is measured to give an indication of the properties of the film. Thus, when the film breaks down the probe will begin to move with the plate 13 so that the arm 23 will be flexed angularly with respect to the frame members 17, 18 in the plane of the framework and the pin 31 will be moved relative to the sensing coil 32. The arrangement of the coil 32 is such that movement of the pin 31 relative to the coil produces an impulse in an external circuit connected through the coil.

It is to be appreciated that since the framework 16 can readily be removed from the casing cleaning of the plate 13 and changing of the probe 24 are facilitated.

Referring to FIG. 3 in a second example of the invention the apparatus includes a body 41 in which is journalled a spindle 40 mounting a circular plate 43 for rotation relative to the body. Also supported by the body is a frame 42 on which is mounted an arm 44 carrying a downwardly extending probe 45, the arm 44 being connected through a cable 46 passing over a pulley 47 to a pan 48 a further cable 49 extending in the opposite direction to the cable 46 and connecting the arm 44 to a plate 51 of a capacitor 51, 52. The weight in the pan 48 is chosen to balance the load applied to the arm 44. The arm 44 can be urged downwardly by placing a weight in a pan 53 positioned above the arm.

In order to test the lubrication properties of a liquid, the liquid is poured onto the plate 43 which is then rotated so that the thickness of the film on the plate gradually decreases, and a point is reached at which interference fringes are observed. Rotation is continued until the thickness of the film is reduced to a value such that the last interference fringe is seen, and when this last fringe passes the edge of the plate 43, or some other conveniently marked position on the plate, a weight is placed in the pan 53 urging the probe 45 into engagement with the plate 43. The friction between the probe 45 and plate 43 breaks down the film after a period of time which is measured to give an indication of the properties of the film. Breakdown is indicated by a marked change in the value of the capacitance 51,52.

Having thus described our invention what we claim as new and desire to secure by Letters Patent is;

1. A method of testing the lubrication properties of a liquid comprising pouring the liquid onto a plate which is rotated so that the thickness of the film of liquid decreases and eventually a point is reached at which interference fringes are observed, and then, when the last interference fringe is seen passing a predetermined point on the plate, placing a selectively weighted probe in contact with the plate and measuring the length of time taken for the frictional heat developed between the probe and plate to destroy the film, and detecting angular movement of the probe relative to the plate caused by the increase of frictional force therebetween.

2. A method as claimed in claim 1 wherein the speed of rotation of the plate is reduced when the last interference fringe is seen passing said predetermined point on the plate, but before the probe is placed in contact with the plate.

3. Apparatus for testing the lubrication properties of a liquid comprising a casing, a plate rotatably mounted on the casing, a framework including first and second frame members, a resilient member secured at one end thereof to said framework intermediate said first and second frame members and carrying at its free end a probe extending from the plane of the framework, the resilience of said resilient member permitting said probe to move angularly relative to said first and second frame members in the plane of the framework but resisting angular movement of the probe relative to said first and second frame members at right angles to the plane of the framework, the framework being pivotally mounted on the casing at a part of the framework remote from said probe and said part of the framework being positioned above said plate so that, by pivoting the framework, the probe can be urged into contact with the plate, means acting on said framework adjacent said probe to pivot the framework and urge said probe into contact with the plate, and sensing means associated with the framework and the free end of said resilient member and operable, in use, to detect angular movement of the probe relative to said first and second frame members in the plane of the framework when the frictional heat developed between the probe and the plate destroys a film of said liquid of predetermined thickness on the plate so that the probe is caused to move in the plane of said framework with the plate.

4. Apparatus as claimed in claim 3 wherein said framework can be removed from the casing.

5. Apparatus as claimed in claim 3 wherein the shear center of the resilient arm is in the same plane as the free end of said probe so that, in use, when a frictional force is developed between said probe and said plate there is no tendency for said arm to twist about the longitudinal axis of the arm.

6. Apparatus as claimed in claim 3 wherein said sensing means comprises a sensing coil and a pin, the arrangement being such that angular movement of the probe relative to said first and second frame members in the plane of the framework causes relative movement between said pin and said coil and the arrangement further being such that relative movement between said pin and said coil induces an impulse in an external circuit through the coil.

7. Apparatus as claimed in claim 3 wherein said sensing means is a capacitor, one plate of the capacitor being fixed and the other plate of the capacitor being movable relative to said one plate in response to angular movement of the probe relative to said first and second frame members in the plane of the framework.

* * * * *